United States Patent Office 3,380,877
Patented Apr. 30, 1968

3,380,877
BINDER COMPOSITION AND METHOD
Clayton A. Smucker and William H. Rigby, Jr., Newark, and Frank P. McCombs, Granville, Ohio, assignors to Owens-Corning Fiberglas Corporation, a corporation of Delaware
No Drawing. Filed Feb. 5, 1965, Ser. No. 430,737
5 Claims. (Cl. 161—170)

ABSTRACT OF THE DISCLOSURE

A binder composition which contains a phenolic resole, urea, and a silane of a specific kind, or the hydrolysis products thereof. Also disclosed is a method which includes the use of such binder composition in the production of products from glass or other vitreous fibers.

---

The use of aqueous dispersions comprising phenolic resoles as binders in the production of wool and board products from glass and other vitreous fibers is common practice. It has also been suggested that phenolic resoles can be modified to improve resistance to heat, including flame, by reaction with dicyandiamide. Similar use of melamine, urea and thiourea to modify phenolic resoles has also been suggested, and for the same purpose. Experimental work indicates that urea, when so used, has some beneficial effect insofar as the elevated temperature properties of the resulting product are concerned, although melamine and dicyandiamide are both more effective in this respect. Furthermore, urea gives rise to serious problems when so used in the production of a binder resin for use in making glass or other vitreous fiber wools or boards. Specifically, the urea-modified phenolic resoles tend to set prematurely,[1] and before they have flowed to a desirable extent on the fibers, to perform inefficiently,[2] and to have poor dilutability.[3] Attempts have also been made to provide binder resin systems which are mixtures of a phenolic resole and urea formaldehyde condensation products; such mixtures, however, have been found to perform inefficiently.

The present invention is based upon the discovery that urea can be mixed, but not appreciably reacted, with phenolic resoles, and that the resulting mixtures are useful in the production of products such as wools and boards from glass and other vitreous fibers. The unreacted or "raw" urea does not cause the resole to cure or set prematurely, does not lower the application efficiency, and actually improves the dilutability; in addition, when one of certain silanes, or a product of the hydrolysis thereof, is used in a binder composition with a phenolic resole and raw urea, certain properties of the finally cured material are unexpectedly improved by comparison with the results achieved if the urea is omitted, if the silane or hydrolysis product is omitted, or if both the urea and the silane or hydrolysis product are omitted.

It is, therefore, an object of the invention to provide an improved binder composition.

It is a further object to provide an improved method for producing products comprising glass or other vitreous fibers and a binder therefor.

It is still another object of the invention to provide an improved product comprising glass or other vitreous fibers and a binder therefor.

Other objects and advantages will be apparent from the description which follows, which is intended only to illustrate and disclose, and in no way to limit the invention.

An improved resole composition is provided according to the invention. Such composition comprises an aqueous dispersion of urea, a resole, and an amino alkyl silane or silane hydrolysis product. In general, the silane or silane hydrolysis product should constitute from about 0.02 percent[4] to about 2 percent of the total solids in the composition, urea should constitute from about 3 percent to about 60 percent, and the phenolic resole should constitute from about 40 percent to about 97 percent. As will subsequently be explained in more detail, the optimum proportions of the several constituents will depend upon many considerations, including the specific use to be made of the composition and the identity of the resole.

The specific identity of the phenolic resole in a composition according to the invention is not critical. Accordingly, the identity of the phenol and of the aldehyde that are reacted to produce the resole is of only incidental importance. Accordingly, the resole can be a partial condensation product of any suitable phenol with any suitable aldehyde (for a discussion of resoles, see Martin, The Chemistry of Phenolic Resins, John Wiley & Sons, Inc., New York, 1956, particularly pages 87 through 98, and cited references). As a practical matter, however, a resole curable to an infusible resite is usually preferred for use in connection with vitreous fibers, so that at least a significant amount of a trifunctional phenol, usually hydroxy benzene for economic reasons, is preferably employed, and formaldehyde, for economic reasons and because of the greater simplicity of its chemical reactions with a phenol, is the preferred aldehyde. Most desirably, the resole is produced by reaction of formaldehyde with phenol (hydroxy benzene), and usually in proportions from 1 mol to 3 mols, preferably, when used as a binder, of from about 1¾ mols to about 2.9 mols, and most desirably of from 2 mols to 2¾ mols of formaldehyde per mol of phenol.

Metallic cations, particularly highly alkaline metallic cations, if present in a phenolic resole applied to glass or other vitreous fibers are detrimental, apparently caus-

---

[1] It is desirable, when a binder composition of the type with which the instant invention is concerned is applied to glass or other fibers, that such composition flow along the fibers to points of fiber-to-fiber contact before cure of the composition occurs. A binder composition which sets prematurely is incapable of such flow to a desired extent, with the result that a greater quantity of the binder composition is required to perform a given function.

[2] Binder resin efficiency is usually expressed as a percent, and is one hundred times the number of pounds on a given quantity of the final product, divided by the number of pounds of binder composition (on a dry solids basis) used to produce the product.

[3] In general, a phenolic resole tends to cloud when diluted with water; the dilutability of a resole is a measure of the extent to which that resole can be diluted, before clouding occurs.

[4] The terms "percent" and "parts," as used herein, and in the appended claims, refer to percent and parts by weight, unless otherwise indicated.

ing deterioration both of the fibers themselves and of the resite binder. Phenolic resoles are usually prepared in the presence of highly alkaline condensing agents, so that the metallic cations thereof are preferably either removed from the resole prior to use, for example by cation exchange treatment of the resole, or converted to a form in which they are harmless. As an example of the latter technique, the condensation to produce the resole can be carried out in the presence of barium hydroxide as a condensing agent, and the barium hydroxide can be neutralized, after completion of the partial condensation to form the resole, with sulfuric acid or the like to produce barium sulfate. The barium sulfate can be left in the resole, since it is harmless, provided that it is in a sufficiently small particle size that it does not impair handling of the resole, or it can be removed by filtration.

As has been indicated above, an improved resole composition according to the invention comprises an amino alkyl silane or silane hydrolysis product. In general, it has been found that any commercially available amino alkyl silane is highly advantageous in such a binder composition. Such silanes have the general formula $$R_n-Si(-O-R')_{(4-n)}$$

wherein R is an amino alkyl radical chemically bonded to the silicon atom, R' is an alkyl radical having from 1 to 4 carbon atoms, and $n$ is an integer from 1:3, inclusive. Optimum results have been achieved using a silane having the general formula $$NH_2C_2H_4NHC_3H_6Si(-OCH_3)_3$$

Excellent results have also been achieved using gamma aminopropyltriethoxy silane. A preferred class of such silanes is one wherein R in the foregoing general formula has the formula $H_2N-R''$ where R'' is an alkylene radical having from 2 to 6 carbon atoms. Another such preferred class is one wherein R has the formula $$H_2N-R''-NH-R'''$$

wherein R'' and R''' are both alkylene radicals having from 2 to 6 carbon atoms.

The invention will be understood more fully by reference to the following examples which are presented solely for the purpose of further illustrating and disclosing, and are in no way to be construed as limiting.

Example 1

A mixing tank provided with a propeller-type agitator was charged with 25 parts of water, and the water and subsequently charged ingredients were stirred during the formulation of a binder composition according to the invention. A 0.02 part portion of an aminoalkyl silane [5] was added to the tank, followed by a 0.12 part portion of ammonium sulfate, a 4.98 part portion of urea, a 7.46 part portion of a Phenolic Resin A,[6] a 1.12 part portion of a 28 percent ammonium hydroxide solution and a 1.24 part portion of a mineral oil emulsified with stearic acid and ammonium carbonate. Sufficient additional water was added to provide a binder composition of 16 percent solids.

The binder composition produced as described in the preceding paragraph was sprayed into a forming hood through which glass fibers were being projected onto a foraminous conveyor. The fibers were collected in the form of a wool-like mass associated with the binder composition. The relative proportions of binder composition and fibers were such that the binder, after cure thereof, constituted approximately 11 percent of the total product. Cure was accomplished in an oven maintained at a temperature of about 400° F. through which the glass fibers and associated binder were passed in a period of about 2 minutes, and in which the product was compressed sufficiently that the final product was a board-like mass of glass fibers bonded to one another at points of contact by a resite formed by cure of the binder composition, and had an apparent density of about 9 pounds per cubic foot, on the average.

For purposes of comparison, but not in accordance with the invention, a binder composition was formulated and used in the production of a glass fiber board product as described in Example 1 from a 6.4 gallon portion of Phenolic Resole A, a 2.1 gallon portion of a Pinewood Pitch extract,[7] 1 quart of 28 percent ammonium hydroxide, 1/3 gallon of mineral oil emulsified with stearic acid and ammonium carbonate, 2½ ounces of ammonium sulfate dissolved in 5 ounces of water, and 0.082 pound of the aminoalkyl silane used in the procedure described in Example 1. This binder composition was used in the manner described above to produce a board-like mass of glass fibers bonded to one another at points of contact by a resite formed by cure of the binder composition, wherein the resite constituted approximately 11 percent of the total product, and the apparent density was about 9 pounds per cubic foot. The bond strength of this product was substantially less than that of the product produced as described in Example 1 and the resite binder was substantially more subject to combustion.

Again, for purposes of comparison, but not in accordance with the invention, a binder composition was formulated as described in Example 1 except that the silane was omitted, and this binder composition was used as described in Example 1 to produce a glass fiber board product having an apparent density of about 9 pounds per cubic foot and a total resite binder content of approximately 11 percent of the total product. This product had a dry bond strength substantially lower than that of the board product produced as described in Example 1, and substantially equivalent to that of the board product produced as described in the preceding paragraph.

Phenolic Resole A was produced by charging a 25 gallon reaction vessel with 172½ pounds of 45 percent formalin, 99¼ pounds of phenol and 5.6 pounds of barium monohydrate, and the resulting charge was heated for a total of 8½ hours during which time it was stirred by a propeller-type agitator. The charge was heated to 110° F., and maintained at about such temperature for approximately 3 hours; heated to 140° F. over a period of about ½ hour and maintained at about 140° F. for an additional 3½ hours; heated to 160° F. over a period of about ½ hour and maintained at about 160° F. for an additional 1 hour; and then cooled to 100° F. The cooled phenol formaldehyde resole which resulted was neutralized with dilute sulfuric acid to a pH of about 7.5.

The procedure described in Example 1 has also been repeated, in accordance with the invention, except that the amount of ammonium sulfate used in formulating the binder composition was reduced to 0.06 part. Substantially identical results were achieved insofar as the properties of the final board-like product were concerned, but cure of the resole binder composition was somewhat slower.

---

[5] The particular aminoalkyl silane used had the formula $NH_2C_2H_4NHC_3H_6Si(-OCH_3)_3$.

[6] Subsequently identified.

[7] The extract used is resinous in nature and had the following analysis:
6 percent high melting furfural condensate (methanol insoluble).
4 percent neutral oils (hydrocarbons, esters and ethers).
9 percent rosin.
5 percent belro-phenol-lactone (probably
$$C_{18}H_{14}O_3.2(OCH_2OH)$$
5 percent flavone type polyphenol (possibly about
$$C_{18}H_{14}O_3.2(OCH_2OH)$$
2 percent fumic acid type compound.
0.2 percent pectic acid type compound.
6 percent air oxidized rosin acid (unfused).
3 percent strongly acidic compound.
38 percent weakly acidic, high melting phenolic compound.
19 percent relatively neutral phenol ethers and esters.
1 percent water soluble carbohydrates, etc.

Example 2

The procedure described in Example 1 has also been used in formulating a binder composition and producing a glass fiber board product therefrom, wherein the binder was formulated from 25 parts of water, 0.03 part of the silane identified in Example 1, 0.6 part of ammonium sulfate, 9 parts of urea, 21 parts of Phenolic Resole A, 2.8 parts of 28 percent ammonium hydroxide, 3 parts of mineral oil emulsified with stearic acid and ammonium carbonate, and sufficient water to provide a binder composition containing 19 percent solids. The final board-like mass of glass fibers had an apparent density of about 2 pounds per cubic foot, and the cured binder constituted approximately 12 percent of the total product. Comparative tests showed that this board-like product was similarly improved, by comparison with other similar products in the manner previously described.

Example 3

Various other binder formulations in accordance with the invention which have been formulated and glass fiber products produced therewith generally according to the method of Example 1 are identified in Table I, below:

TABLE I

| Sample No. | 3 | 4 | 5 | 6 | 7 |
|---|---|---|---|---|---|
| Binder formulation, parts: | | | | | |
| Water | 11 | 25 | 25 | 25 | 25 |
| Silane [1] | 0.00086 | 0.018 | 0.005 | 0.0031 | 0.006 |
| Ammonium sulfate | 0.04 | 0.06 | 0.026 | 0.016 | 0.1 |
| Urea | 0.26 | 11.9 | 0.52 | 1.24 | 2.19 |
| Phenolic Resole A | 0.6 | 6.57 | 3.77 | 18.65 | 5.11 |
| 28 percent ammonium hydroxide | 0.08 | 1.26 | 0.7 | 0.28 | 0.77 |
| Pinewood Pitch extract [2] | | 4.18 | | | |
| Pinewood Pitch extract, Tall Oil Pitch-blend [3] | | | 0.94 | | |
| Oil Emulsion [1] | 0.1 | 1.19 | 0.65 | 0.28 | 0.25 |
| Water to provide a solids content of (percent) | 8.0 | 15.0 | 7.0 | 4.0 | 9.0 |
| Glass fiber product: | | | | | |
| Percent binder | 4½ | 11 | 4½ | 4¾ | 10–20 |
| Apparent density, pounds per cubic foot | 0.75 | 9 | 0.75 | 2 | 0.3–2 |

[1] Identified in Example 1.
[2] Previously identified.
[3] The blend used was a mixture of equal parts of the previously identified Pinewood Pitch extract and of a Tall Oil Pitch having a flash point of 545° F.

In the binder formulations which have been specifically identified, the ammonium sulfate tends to accelerate the cure; the oil tends to improve the feel of the glass fiber product; the Pinewood Pitch extract and the Pinewood Pitch extract-Tall Oil pitch-blend are reactive extenders for the binder composition: such materials and equivalents therefor can be used in accordance with the invention, but are not essential.

The consequences of numerous variations in binder composition have also been investigated by a test procedure described in Example 4, below, wherein typical test results are also presented. The results of this test procedure have been found to correlate well with the results achieved on glass fiber products made under commercial conditions.

Example 4

Test specimens were prepared from a mixture of 36 parts of a phenolic resole containing 50 percent resin solids or 50 percent of combined urea and resin solids and 582 parts of soda lime glass beads; for various tests, different amounts of various aminoalkyl silanes and of ammonium sulfate were added to the phenolic resole or urea-resole composition prior to mixture thereof with the beads. The test specimens were then produced by placing the resole-glass bead composition against a pattern heated to a temperature of about 425° F. Portions of the resole glass bead admixture adhered to the heated pattern, and, after about a 7 minute cure, constituted a shell mold. For most compositions tested, a total of 64 such molds were produced; 32 mols were conditioned for 16 hours under ambient conditions of about 75° F. and 50 percent relative humidity; and 32 molds were conditioned for 16 hours at 50° C. in an atmosphere of substantially 100 percent relative humidity. In the following tables, tensile strengths of test specimens made with various resole and resole-urea binders are presented. Each tensile strength is given in pounds per square inch, and each figure represents the average of 32 breaks. The term "wet tensile strength" is the average value on specimens conditioned 16 hours at 50° C. in an atmosphere of substantially 100 percent relative humidity, while the term "dry tensile strength" refers to the specimens conditioned under ambient conditions. In Tables II, III and IV, the phenolic resole employed was produced by substantially the procedure used in the preparation of Phenolic Resole A, the only difference being that the final heating step, at 160° F. was terminated to provide a final free formaldehyde content in the resole of 5 percent (Table II), 6 percent (Table III) or 7 percent (Table IV) rather than after a fixed time.

TABLE II

| Percent urea [1] in binder composition, based upon total urea and phenolic resin solids therein | 0 | 30 | 40 | 50 |
|---|---|---|---|---|
| Average dry tensile strength | 720 | 1,090 | 1,000 | 880 |
| Average wet tensile strength | 600 | 1,040 | 900 | 900 |

[1] The binder also contained 1 percent of ammonium sulfate and 0.1 percent of the silane identified in Example 1, both based upon the weight of phenolic resin solids, and urea.

TABLE III

| Percent urea [1] in binder composition, based upon total urea and phenolic resin solids therein | 0 | 30 | 40 | 50 |
|---|---|---|---|---|
| Average dry tensile strength | 840 | 930 | 1,020 | 940 |
| Average wet tensile strength | 690 | 770 | 880 | 800 |

[1] The binder also contained 1 percent of ammonium sulfate and 0.1 percent of the silane identified in Example 1, both based upon the weight of phenolic resin solids, and urea.

TABLE IV

| Percent urea [1] in binder composition, based upon total urea and phenolic resin solids therein | 0 | 30 | 40 | 50 |
|---|---|---|---|---|
| Average dry tensile strength | 760 | 860 | 970 | 940 |
| Average wet tensile strength | 640 | 860 | 950 | 900 |

[1] The binder also contained 1 percent of ammonium sulfate and 0.1 percent of the silane identified in Example 1, both based upon the weight of phenolic resin solids, and urea.

The data in Table V show the tensile strength of test specimens as a function of urea content where the phenolic resole was produced by a method generally similar to that used in producing Phenolic Resole A, except that the mol ratio of formaldehyde to phenol was 1.9:1.

TABLE V

| Percent urea [1] in binder compostion, based upon total urea and phenolic resin solids therein | 0 | 30 | 40 | 50 |
|---|---|---|---|---|
| Average dry tensile strength | 709 | 1,160 | 1,170 | 1,160 |
| Average wet tensile strength | 520 | 1,050 | 1,090 | 1,080 |

[1] The binder also contained 1 percent of ammonium sulfate and 0.1 percent of the silane identified in Example 1, both based upon the weight of phenolic resin solids, and urea.

Test specimens have also been prepared and have found to demonstrate satisfactory strength properties when the phenolic resin employed was produced from formaldehyde and phenol in a mol ratio as low as 1.4:1 and as high as 2.9:1.

Various other tests have been run to evaluate the effect of urea additions to phenolic resoles upon various properties of binder compositions. The tests were run on phenolic resoles produced by the method employed in producing Phenolic Resole A, except that the final cooking step at 160° F. was interrupted when the free formaldehyde content of the resole was 7 percent and a sample, subsequently called "7 percent Resole," was withdrawn. Cooking was then resumed until the free formaldehyde content of the resole was 6 percent, at which time a sample, subsequently called "6 percent Resole," was withdrawn. Cooking was then resumed until the free formaldehyde content was 5 percent; this material is subsequently called "5 percent Resole."

In one series of tests, additions of varying amounts of urea were made to each of the three resoles identified in the preceding paragraph, and the effect upon free formaldehyde content was determined analytically. The results of these tests are presented in Table VI, below:

TABLE VI

| Phenolic Resole | Percent of urea in binder composition, based upon total urea and phenolic resin solids therein | Free formaldehyde content, after urea addition, based upon total phenolic resin solids |
|---|---|---|
| 5 percent resole | 30 | 3.7 |
|  | 40 | 3.6 |
|  | 50 | 3.3 |
| 6 percent resole | 30 | 4.8 |
|  | 40 | 4.8 |
|  | 50 | 4.4 |
| 7 percent resole | 30 | 5.0 |
|  | 40 | 5.0 |
|  | 50 | 4.4 |

In another series of tests the application efficiency of various compositions was determined by directing resole compositions from an atomizer through a cone made from glass fiber fabric and determining the weight of resole composition retained on the glass fiber fabric cone. Application efficiencies, as reported in Table VII, below, are one hundred times the weight of resin retained on the cone, divided by the weight of resin atomized.

TABLE VII

| Phenolic Resole | Percent of urea in binder composition, based upon total urea and phenolic resins solids therein | Application Efficiency |
|---|---|---|
| 5 percent resole | 0 | 64.1 |
|  | 30 | 72.0 |
|  | 40 | 75.6 |
|  | 50 | 69.4 |
| 6 percent resole | 0 | 64.8 |
|  | 30 | 67.0 |
|  | 40 | 66.3 |
|  | 50 | 70.2 |
| 7 percent resole | 0 | 62.8 |
|  | 30 | 64.9 |
|  | 40 | 64.3 |
|  | 50 | 67.2 |

It has been found that, in general, a phenolic resole or phenolic resole composition having a higher application efficiency as measured by the cone test also has a higher application efficiency when applied as a part of a binder composition in the commercial production of glass fiber products. Application efficiency under commercial conditions is one hundred times the weight of binder composition in a given quantity of glass fiber product, divided by the number of pounds of binder composition, on a dry solids basis, used to produce that quantity of product.

In another series of tests, the time required for various compositions to gel was determined. Gel time was measured by placing a sample of each composition on a hot plate maintained at 300° F. and determining the time required for gelling and curing to such an extent that the sample adhered to a spatula, when patted therewith, and formed fibers. Gel times for various composition, as determined by this test, are presented in Table VIII, below:

TABLE VIII

| Phenolic Resole | Percent of urea in binder composition, based upon total urea and phenolic resin solids therein | Gel time, seconds |
|---|---|---|
| 5 percent resole | 0 | 145 |
|  | 30 | 200 |
|  | 40 | 225 |
|  | 50 | 245 |
| 6 percent resole | 0 | 170 |
|  | 30 | 180 |
|  | 40 | 220 |
|  | 50 | 305 |
| 7 percent resole | 0 | 175 |
|  | 30 | 180 |
|  | 40 | 240 |
|  | 50 | 310 |
| 5 percent resole [1] | 0 | 180 |
|  | 30 | 145 |
|  | 40 | 160 |
|  | 50 | 165 |
| 6 percent resole [1] | 0 | 225 |
|  | 30 | 145 |
|  | 40 | 163 |
|  | 50 | 145 |
| 7 percent resole [1] | 0 | 270 |
|  | 30 | 140 |
|  | 40 | 145 |
|  | 50 | 150 |

[1] The binder also contained 1 percent of ammonium sulfate based upon the weight of phenolic resin solids, and urea, Substantially equivalent results have also been achieved with other commercially available aminoalkyl silanes, for example, gamma amino propyl triethoxy silane. Other types of silanes, however, for example vinyl alkoxy silanes, are not equivalent, substantially reduced strengths, both wet and dry having been achieved therewith.

It will be apparent from the foregoing data that substantial variation is possible in composition of a binder material according to the invention. The essential ingredients, as previously stated, are a phenolic resole, urea and an aminoalkyl silane or silane hydrolysis products. Optimum results from the standpoints of binder strength and application efficiency, as determined by the previously identified cone test, have been achieved in binder compositions containing from about 50 percent to about 70 percent of a phenolic resole, from about 30 percent to about 50 percent of urea, and from about 0.02 percent to about 0.25 percent of a silane or silane hydrolysis product. Most desirably, the binder composition should contain from about 55 percent to about 65 percent of a phenolic resole, from about 35 percent to about 45 percent of urea, and from about 0.05 percent to about 0.25 percent of an aminoalkyl silane or of the hydrolysis products thereof.

It will be apparent that various changes and modifications can be made from the specific details set forth herein and described in the foregoing examples without departing from the spirit and scope of the invention as defined in the appended claims.

What we claim is:

1. An improved phenolic resole binder composition which is an aqueous dispersion consisting essentially of urea, a phenolic resole, a member of the group consisting of an aminoalkyl silane having the general formula $(H_2NR''NHR'''-)_n Si(OR')_{4-n}$, wherein $n$ is an integer from 1 to 3, $R'$ is an alkyl group having from 1 to 4 carbon atoms, $R''$ is an alkylene group having from 2 to 6 carbon atoms, and R''' is an alkylene group having from 2 to 6 carbon atoms, and the hydrolysis products thereof, and water in such proportions that the phenolic resole constitutes from about 40 percent to about 97 percent of the composition, urea constitutes from about 3 percent to about 60 percent thereof, and the silane constitutes from about 0.02 percent to about 2 percent thereof, all based upon the total of urea and phenolic resole solids in the composition.

2. A vitreous fiber product comprising a mass of intermeshed vitreous fibers and a binder composition adhering said fibers to one another at points of contact, said binder having been formed by cure at an elevated temperature of an aqueous dispersion consisting essentially of urea, a phenolic resole, a member of the group consisting of an aminoalkyl silane having the general formula $(H_2NR''NHR'''-)_nSi(OR')_{4-n}$, wherein $n$ is an an integer from 1 to 3, R' is an alkyl group having from 1 to 4 carbon atoms, R'' is an alkylene group having from 2 to 6 carbon atoms, and R''' is an alkylene group having from 2 to 6 carbon atoms, and the hydrolysis products thereof, and water in such proportions that the phenolic resole constitutes from about 40 percent to about 97 percent of the composition, urea constitutes from about 3 percent to about 60 percent thereof, and the silane constitutes from about 0.02 percent to about 2 percent thereof, all based upon the total of urea and phenolic resole solids in the composition.

3. In a method for producing a vitreous fiber product whic includes the steps of collecting on a suitable conveyor a mass of vitreous fibers intermeshed with one another, associating a curable binder composition with the intermeshed fibers, and subjecting the mass of fibers and associated binder to an elevated temperature to cause cure of the binder, the improvement of using as the binder composition an aqueous dispersion consisting essentially of urea, a phenolic resole, a member of the group consisting of an aminoalkyl silane having the general formula $(H_2NR''NHR'''-)_nSi(OR')_{4-n}$, wherein $n$ is an integer from 1 to 3, R' is an alkyl group having from 1 to 4 carbon atoms, R'' is an alkylene group having from 2 to 6 carbon atoms, and R''' is an alkylene group having from 2 to 6 carbon atoms, and the hydrolysis products thereof, and water in such proportions that the phenolic resole constitutes from about 40 percent to about 97 percent of the composition, urea constitutes from about 3 percent to about 60 percent thereof, and the silane constitutes from about 0.02 percent to about 2 percent thereof, all based upon the total of urea and phenolic resole solids in the composition.

4. An improved binder composition as claimed in claim 1, wherein urea constitutes from about 30 percent to about 50 percent, the phenolic resole constitutes from about 50 percent to about 70 percent and the silane constitutes from about 0.02 percent to about 0.25 percent.

5. An improved binder composition as claimed in claim 1 wherein urea constitutes from about 35 percent to about 45 percent, the phenolic resole constitutes from about 55 percent to about 65 percent and the silane constitutes from about 0.02 percent to about 0.25 percent.

References Cited

UNITED STATES PATENTS

| | | | |
|---|---|---|---|
| 3,158,519 | 11/1964 | Shannon et al. | 260—29.3 |
| 3,209,053 | 9/1965 | Gilkey et al. | 260—826 |
| 3,215,585 | 11/1965 | Kneipple | 117—126 |
| 3,223,668 | 12/1965 | Stalego | 260—29.3 |
| 3,234,159 | 2/1966 | Cooper | 260—29.3 |

MURRAY TILLMAN, *Primary Examiner.*

J. C. BLEUTGE, *Assistant Examiner.*